Patented Mar. 22, 1932

1,850,135

UNITED STATES PATENT OFFICE

DONALD H. POWERS, OF PENNS GROVE, NEW JERSEY, ASSIGNOR TO E. I. DU PONT DE NEMOURS & COMPANY, OF WILMINGTON, DELAWARE, A CORPORATION OF DELAWARE

RUBBER PRODUCT AND PROCESS OF PREPARING SAME

No Drawing.    Application filed October 4, 1926.    Serial No. 139,563.

This invention relates to an improved process for treating rubber and similar materials and to the products obtained thereby. More particularly it relates to the art of vulcanizing rubber and to a new class of compounds especially adapted to accelerate the vulcanization.

The invention has among its principal objects the provision of a process whereby the time and temperature required for satisfactory vulcanization can be lessened and the attainment of a rubber product which is of superior quality and durability.

This application is in the nature of a continuation, in part, of my Patent No. 1,732,532, filed June 3, 1925, which covers products resulting from the interaction of an aldehyde, a primary amine, and carbon disulphide and the employment of these products as vulcanization accelerators. The accelerators described herein are a special type of the broad class of accelerators described and claimed in the parent application.

I have now discovered that if the carbon bisulfide is caused to react with the amine first and the resulting product then caused to react with the aldehyde that products particularly valuable for use as accelerators are obtained. Also, I have discovered that those aldehydes containing a plurality of carbon atoms are best adapted for the production of accelerators of this type and that, if certain ratios of the three components, which ratios were not specifically disclosed in the previous application, are employed, products of very unusual activity as accelerating agents result. Particularly, I have discovered that the use of two, three, four or even five moles of an aldehyde with one mole of amine gives compounds of remarkable activity. The amines and aldehydes used may be either aliphatic or aromatic, although in the preferred embodiments of my invention I employ aliphatic aldehydes. The compounds resulting are of indefinite composition.

When the amine and the $CS_2$ are mixed a dithio carbamate is formed:

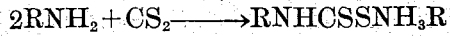

$$2RNH_2 + CS_2 \longrightarrow RNHCSSNH_3R$$

This dithio carbamate is heated under pressure with two or more moles of an aldehyde to give, most probably, a condensation product with the elimination of water:

$$RNHCSSNH_3R + R'CHO \rightarrow (RNCSSNR)(CR')X + XH_2O$$

The preparation of the new accelerators may be best disclosed by the presentation of a number of examples embodying the invention. It is to be understood that these examples are purely illustrative and that the conditions, reagents and proportions therein specified are susceptible of variation. The examples follow:

*Example 1.*—To two hundred and fifteen pounds of melted paratoluidine, one hundred pounds of carbon disulfide is slowly added under a reflux condenser. Four hundred and fifty pounds of butyraldehyde is slowly added and the product heated under pressure for three hours at 130° C. The water is separated and the product dried in vacuum. In a stock of one hundred parts of smoked sheet, three parts of zinc oxide, three and a half parts of sulfur, and 0.375 parts of accelerator, a good cure was obtained in thirty minutes at twenty-five pounds steam pressure.

*Example 2.*—To 200 lbs. of aniline are slowly added 100 lbs. of carbon bisulfide. The product is cooled and mixed until the reaction is complete. 1000 lbs. of heptaldehyde are then added below the surface, cooling the mixture during the addition. The resulting product is heated under pressure at 125° C. for three hours. The resulting compound is purified by distilling off any unreacted volatile materials under vacuum. This product, when tested in a percentage of 0.5, in a stock containing 100 parts of smoked sheet, 5 parts of zinc oxide, and 3 parts of sulfur, gave a good cure in 30 minutes at 25 lbs. steam pressure.

*Example 3.*—100 lbs. of carbon bisulfide are slowly added, under reflux, to 150 lbs. of butylamine, which has previously been cooled to 0° C. After the addition is complete 600 lbs. of butyraldehyde are rapidly added. The autoclave is closed and the mixture heated to 110° C. for 2 hours, after which any unreacted volatile constituents are removed under vacuum. This product, when tested in a percentage of 0.375, in a stock containing 100 parts of smoked sheet, 5 parts of zinc oxide, and 3 parts of sulfur, gave a good cure in 25 minutes at 25 lbs. steam pressure.

While I have mentioned for purposes of illustration definite quantities of the reacting components and certain specific temperatures and times of reaction, and in general have given exact conditions under which my improved compounds may be made, I, of course, do not limit myself to these specific proportions or conditions. These illustrative conditions and methods of effecting the interaction and combination of the ingredients may obviously be varied without departing from my invention. In certain cases I may use more than one aldehyde and I may, of course, use other aldehydes than those specified in the examples, also more than one amine or a mixture of aromatic and aliphatic amines may be used. As little as one half a mole of carbon disulfide for each mole of amine may be employed.

In the claims where I specify an amine, I intend to cover, also, the substituted amines as the homologues of aniline. Where I specify "rubber" I intend to cover all the botanical varieties of caoutchouc, which include hevea, balata, gutta percha, etc., and recognized substitutes therefor.

The vulcanization of the rubber compounds resulting from the employment of the new accelerator products is effected in less than the time normally required and the resulting rubber is of superior quality.

I claim:

1. The process of treating rubber which comprises incorporating therewith, prior to vulcanization, the product obtained by causing carbon bisulfide to react with a primary amine to form an addition compound and subsequently causing this compound to further react with an aldehyde.

2. The process of treating rubber which comprises incorporating therewith, prior to vulcanization, the product obtained by causing carbon bisufide to react with a primary aromatic amine to form an addition compound and subsequently causing this compound to further react with an aldehyde.

3. The process of treating rubber which comprises incorporating therewith, prior to vulcanization, the product obtained by causing carbon bisulfide to react with a primary aromatic amine to form an addition compound and subsequently causing this compound to further react with an aliphatic aldehyde.

4. The process of treating rubber which comprises incorporating therewith, prior to vulcanization, the product obtained by causing carbon bisulfide to react with a primary aromatic amine to form an addition compound and subsequently causing this compound to further react with an aliphatic aldehyde containing a plurality of carbon atoms not in excess of seven.

5. The process of treating rubber which comprises incorporating therewith, prior to vulcanization, the product obtained by causing carbon bisulfide to react with a primary aromatic amine to form an addition compound and subsequently causing this compound to further react with butyraldehyde.

6. The process of treating rubber which comprises incorporating therewith, prior to vulcanization, the product obtained by causing carbon bisulfide to react with aniline to form an addition compound and subsequently causing this compound to further react with butyraldehyde.

7. A rubber composition obtainable by incorporating with rubber a vulcanizing agent and the product obtained by causing an aldehyde to react on the addition product of a primary aromatic amine and carbon bisulfide, and then vulcanizing.

8. A rubber composition obtainable by incorporating with rubber a vulcanizing agent and the product obtained by causing an aliphatic aldehyde containing not more than seven carbon atoms to react on the addition product of a primary aromatic amine and carbon bisulfide, and then vulcanizing.

9. A rubber composition obtainable by incorporating with rubber a vulcanizing agent and the product obtained by causing an aliphatic aldehyde containing a plurality of carbon atoms to react on the addition product of a primary aromatic amine and carbon bisulfide, and then vulcanizing.

10. A rubber composition obtainable by incorporating with rubber a vulcanizing agent and the product obtained by causing butyraldehyde to react on the addition product of a primary aromatic amine and carbon bisulfide, and then vulcanizing.

11. A rubber composition obtainable by incorporating with rubber a vulcanizing agent and the product obtained by causing butyraldehyde to react on the addition product of aniline and carbon bisulfide, and then vulcanizing.

12. A rubber composition obtainable by incorporating with rubber a vulcanizing agent and an accelerator obtained by causing from two to five moles of butyraldehyde to react on the reaction product of a mole of aniline and carbon bisulfide, and then vulcanizing.

13. The process of treating rubber which comprises incorporating therewith prior to vulcanization the product obtained by causing carbon bisulfide to react with a compound of the class comprising aniline, primary monoalkyl substituted phenylamines and primary alkyl amines and subsequently causing this compound to further react with a saturated straight chain aliphatic aldehyde containing not more than seven carbon atoms.

14. A rubber composition obtainable by incorporating with rubber a vulcanizing agent and a product obtained by causing a saturated straight chain aliphatic aldehyde containing not more than seven carbon atoms to react on the addition product of carbon bisulfide and an amine of the class comprising aniline, primary mono-alkyl substituted phenylamines and primary alkyl amines.

15. The process of treating rubber which comprises incorporating therewith prior to vulcanization a product containing as its major constituent a compound probably having a formula of the general type $$(R.N.C.S.S.N.R)(CR')_x$$

said compound being obtained by causing carbon bisulfide to react with 1 mole of an amine of the class consisting of para toluidine, aniline, and butylamine to form an addition product, and subsequently causing the resulting product to react with from 2 to 5 moles of a saturated straight chain aliphatic aldehyde containing not more than 7 carbon atoms.

16. The process of treating rubber which comprises incorporating therewith prior to vulcanization the product obtained by causing carbon bisulfide to react with 1 mole of an amine of the class consisting of aniline and the mono-alkyl substituted phenylamines to form an addition product, and subsequently causing the resulting product to react with from 2 to 5 moles of a saturated straight chain aliphatic aldehyde containing not more than 7 carbon atoms.

17. The process of treating rubber which comprises incorporating therewith prior to vulcanization the product obtained by causing carbon bisulfide to react with 1 mole of an amine of the class consisting of para toluidine, aniline, and butylamine to form an addition product, and subsequently causing the resulting product to react with from 2 to 5 moles of a saturated straight chain aliphatic aldehyde containing not more than 7 carbon atoms.

18. The process of treating rubber which comprises incorporating therewith prior to vulcanization the product obtained by causing carbon bisulfide to react with 1 mole of an amine of the class consisting of aniline and the mono-alkyl substituted phenylamines to form an addition product, and subsequently causing the resulting product to react with from 2 to 5 moles of an aliphatic aldehyde of the class consisting of butyraldehyde and heptaldehyde.

19. The process of treating rubber which comprises incorporating therewith prior to vulcanization the product obtained by causing carbon bisulfide to react with 1 mole of an amine of the class consisting of para toluidine, aniline, and butylamine to form an addition product, and subsequently causing the resulting product to react with from 2 to 5 moles of an aliphatic aldehyde of the class consisting of butyraldehyde and heptaldehyde.

20. The process of treating rubber which comprises incorporating therewith, prior to vulcanization, the product obtained by causing carbon bisulfide to react with an amine to form an addition compound and subsequently causing this compound to further react with an aldehyde, two to five moles of aldehyde being employed for every mole of amine.

21. A process, such as covered by claim 20, in which between three and five moles of aldehyde are employed for every mole of amine.

22. A rubber composition obtainable by incorporating with rubber a vulcanizing agent and an accelerator obtained by causing carbon bisulfide to react with an amine to form an addition compound and subsequently causing this compound to further react with an aldehyde, two to five moles of aldehyde being employed for every mole of amine, and then vulcanizing.

23. A rubber composition obtainable by incorporating with rubber a vulcanizing agent and an accelerator obtained by causing carbon bisulfide to react with an amine to form an addition compound and subsequently causing this compound to further react with an aldehyde, between three and five moles of aldehyde being employed for every mole of amine, and then vulcanizing.

In testimony whereof I affix my signature.

DONALD H. POWERS.